Nov. 15, 1927.
H. M. HARRISON
ADVERTISING MACHINE
Filed March 1, 1924
1,649,688
3 Sheets-Sheet 3
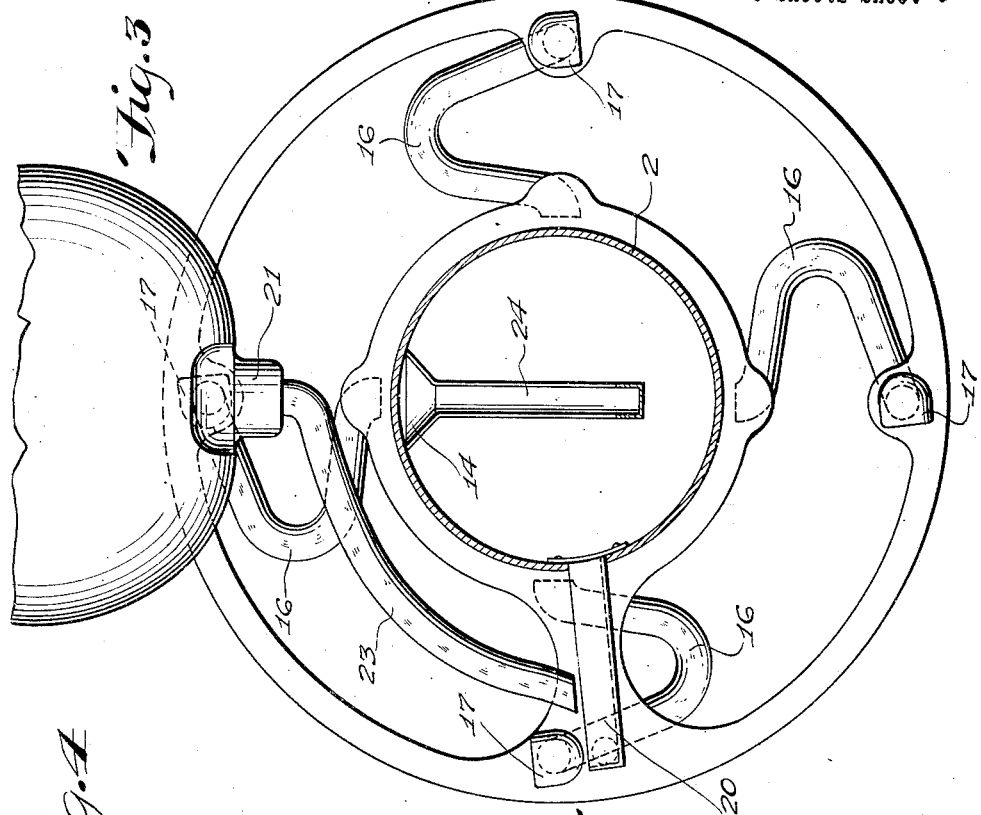
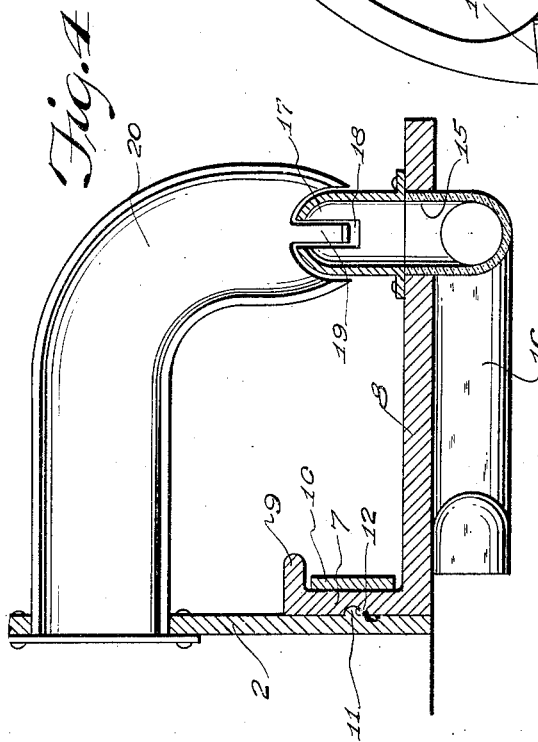
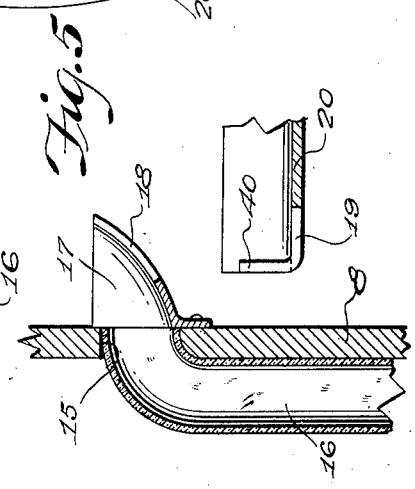
H. M. Harrison
INVENTOR
BY Victor J. Evans
ATTORNEY Patented Nov. 15, 1927.

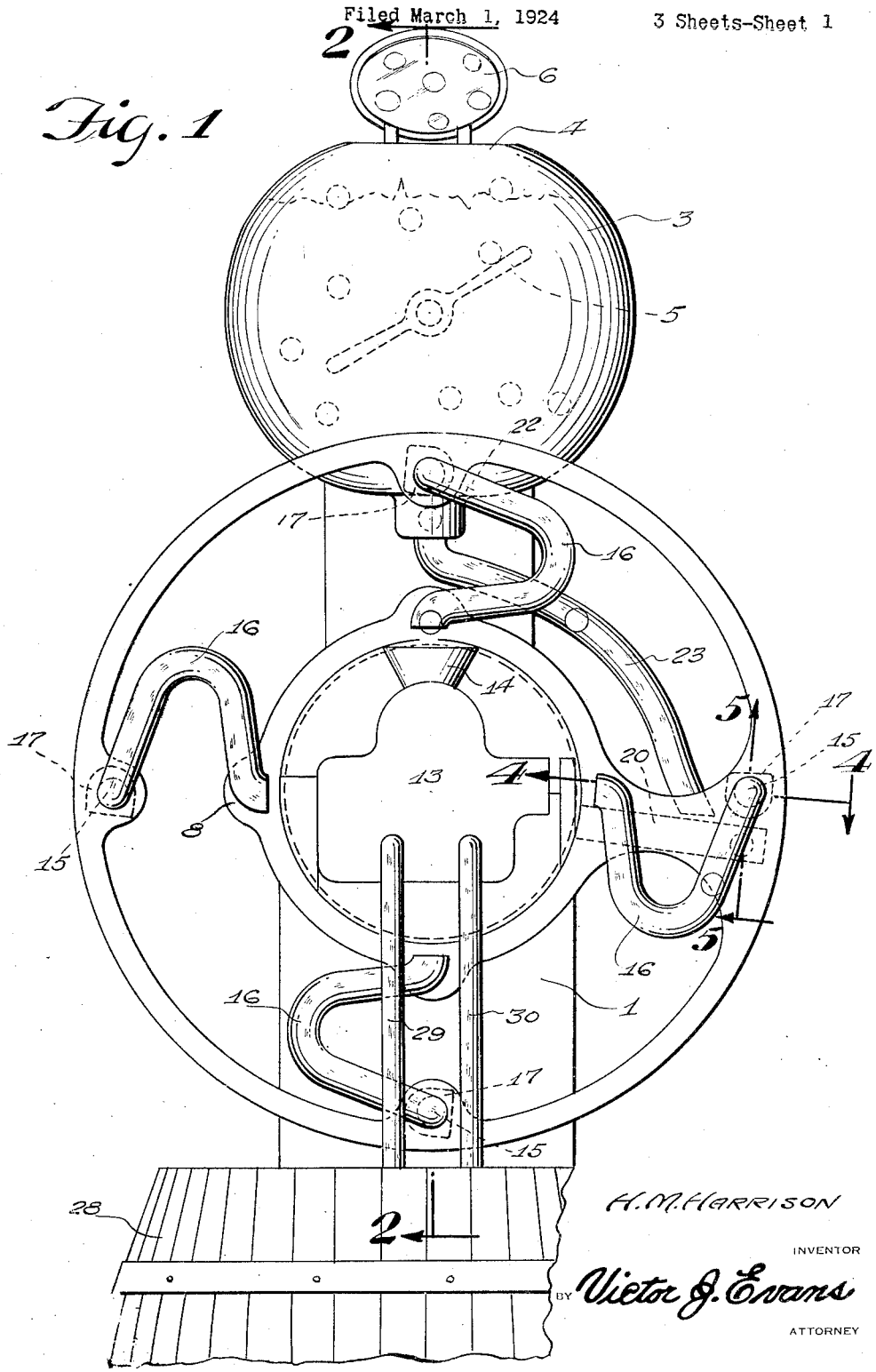

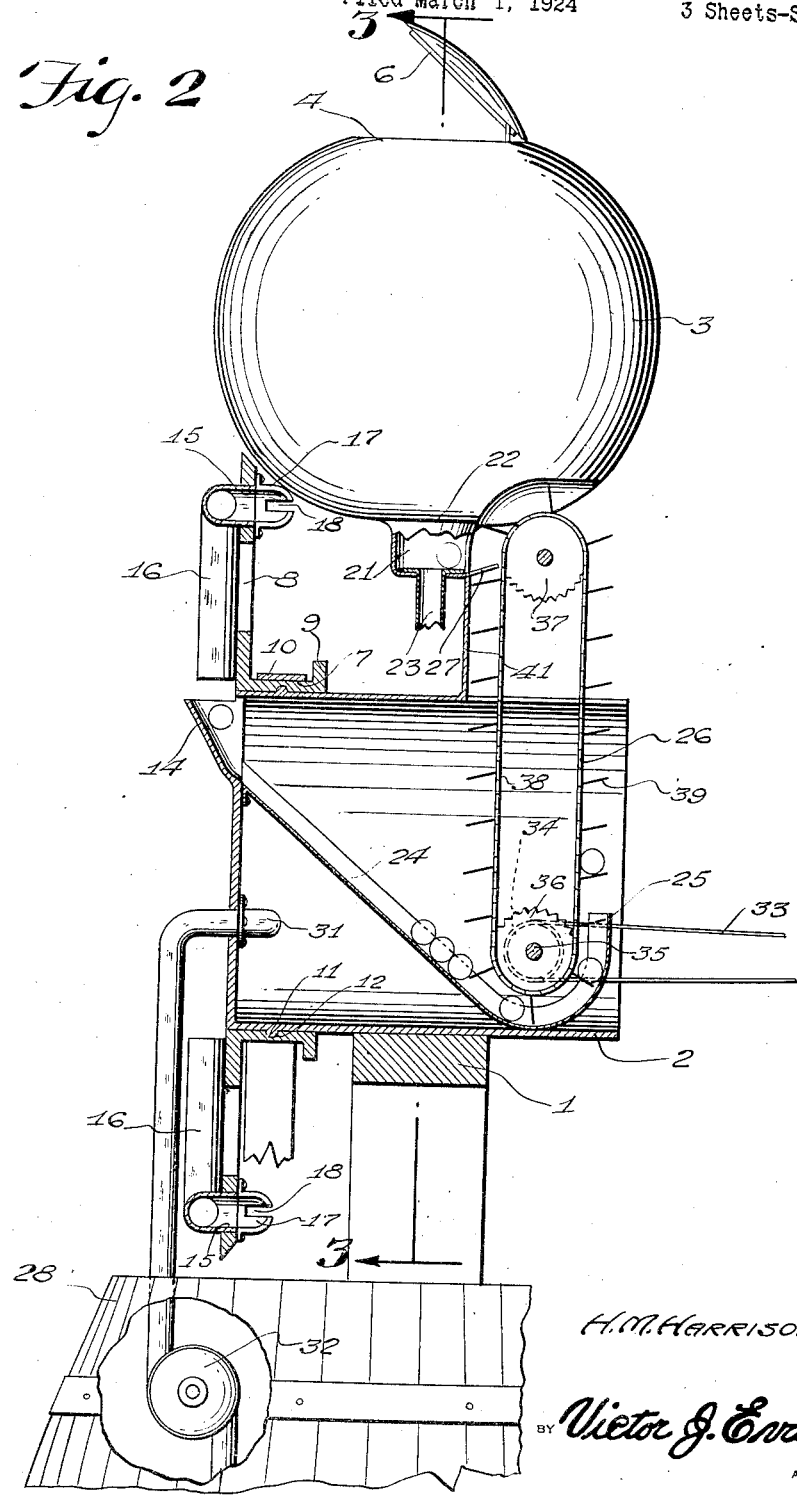

1,649,688

UNITED STATES PATENT OFFICE.

HULEN M. HARRISON, OF CHICAGO, ILLINOIS.

ADVERTISING MACHINE.

Application filed March 1, 1924. Serial No. 696,331.

This invention relates to new and useful improvements in advertising machines and more particularly to a device of this character which is especially adapted for use in advertising fruit juice drinks. The main object of the present invention is the provision of an advertising machine, the novelty of which, during its operation, will have a tendency to attract the general public to the booth, store or other location where the fruit juice drinks are being dispensed.

Another object of the present invention is the provision of an advertising machine which is so constructed and arranged as to give the general appearance of washing and grinding different types of fruit for obtaining the juice of the fruit for making fruit juice drinks.

With the above and other objects in view the invention consists in the novel features in construction, the combination and arrangement of parts hereinafter more fully set forth, pointed out in the claims and shown in the accompanying drawings in which:

Fig. 1 is a front elevation of my improved machine.

Fig. 2 is a vertical sectional view.

Fig. 3 is a rear elevation of the conveying wheel.

Fig. 4 is a detail sectional view taken on the line 4—4 of Fig. 1.

Fig. 5 is a detail sectional view taken on the line 5—5 of Fig. 1.

In carrying out my invention I provide a main supporting stand 1 upon which is mounted a suitable housing 2 and arranged above the housing is a suitable receptacle 3, said receptacle being preferably spherical as illustrated and adapted to give the appearance of a large orange or other similar type of fruit. This receptacle 3 is provided at its upper end with an opening 4 and arranged within the receptacle is an agitator 5, movement being imparted to said agitator in any desired manner. Arranged above the opening 4 and positioned so that the same may be viewed from the front of the machine is a mirror 6, said mirror being so positioned as shown in Fig. 2 that the interior of the receptacle may be readily viewed from the front of the machine; and in order to give the appearance of washing the fruit from which the juice is to be removed a quantity of liquid cleansing material is placed within the receptacle and a predetermined quantity of fruit is placed within the cleansing liquid and through rotation of the agitator 5 the appearance from the mirror 6 discloses the cleansing of the fruit.

Mounted upon the housing 2 at the forward end thereof is a pulley 7 having outstanding flanges 8 formed at its outer edge to provide spaced ears on the pulley and an additional flange 9 is formed upon the inner edge of the pulley providing a channel or trough for receiving the belt 10 which may be connected to any suitable source of power for imparting movement to the pulley. To further prevent lateral movement of the pulley 7 with respect to the housing 2 an annular rib 11 is formed upon the exterior of the housing and is fitted within a recess 12 formed in the inner face of the pulley 7 thus retaining the pulley in position on the housing 2.

The front closed end of the housing 2 is stamped or formed so as to give the general appearance of a grinding device as at 13, said grinding device having a hopper 14 for receiving fruit or other articles to be ground. The hopper is formed by bending or stamping out the metal forming the closed end of the housing as clearly illustrated in Fig. 2. The hopper standing out from the closed end of the housing.

The flanges 8 of the pulley 7 are provided with openings 15 and extending through these openings are the outer ends of the tubes 16, the tubes being secured upon the front faces of the flanges 8 and preferably of a substantially U shaped form as illustrated in Fig. 1. As shown in Fig. 2 the ends of the tubes 16 which extend through the openings 15 are provided with receiving shoes 17, each receiving shoe having a central slot 18 formed therein to permit the passage of a tongue 19 formed in the outer end of the trough 20 whereby it will be apparent that as each of the receiving shoes 17 passes the outer end of the trough 20 the tongue 19 will pass through the slot 18.

The trough 20 is so positioned that the inner end thereof extends through the wall of the housing 2 and is secured thereto in any suitable manner. The receptacle 3 is provided upon its lower side with an extension 21 separated from the main receptacle by the partition 22 and leading from the extension is a conveying pipe or in other words a discharge pipe 23, the lower end of which is arranged directly above the hopper trough 20 and from this it will be apparent that the fruit after being removed from the outer end of the trough 20, is conveyed upwardly through the rotation of the pulley 7 and when the tubes 16 are arranged directly above the grinding device 13 the fruit within the tube will be deposited in the hopper 14 of the grinding device and after being received in the hopper it is discharged down the chute 24 to the curved portion 25 thereof and in order to convey the fruit from the curved portion 25 of the chute an endless conveyor 26 is provided which carries the fruit upwardly and deposits it on the fingers 27 which project outwardly from the open side of the extension 21 thus conveying the fruit from the curved portion 25 of the chute to the extension 21 on the receptacle 3 and allowing the same to pass downwardly through the discharge pipe 23 and into the trough 20 after which the same operation will be carried out with each one of the tubes 16.

In order to give the appearance of conveying the fruit juice from the grinding device 13 to a receptacle 28 the pipes 29 and 30 are provided, the inner ends of which project through the front or closed end of the housing 2 and are coupled together as at 31 at the upper ends and arranged in the lower ends is a suitable pump 32 whereby the liquid within the pipes 29 and 30 may flow downwardly through the pipe 29 and be pumped back up through the pipe 30 thus giving the impression to the public that the juice from the supposedly crushed fruit is flowing downwardly into the receptacle 28.

From the foregoing it will be readily apparent that a view from the front of this machine will readily give the impression that the fresh fruit is being crushed and the juice therefrom conveyed into the receptacle 28 and as this appears to be a continuous operation it will give the appearance of the serving of fresh juice at all times.

The tubes 16 are transparent, that is they may be made of glass or other transparent material of suitable weight to withstand usage so as to display to the public the fact that the fruit is received in the shoe end of the tube and discharged into the hopper 14 of the grinding device.

Attention is also directed to the fact that the endless conveyor 26 may be driven through the medium of a belt 33 which receives its power from any suitable source and passes around a pulley 34 on the shaft 35 which supports the sprocket 36, said sprocket being connected to a second sprocket 37 through the conveyor chain 38 whereby movement will be imparted to the endless conveyor 26. Flights 39 which are attached to the chain 38 are of a construction to readily permit them to pass through the fingers 27 so as to deposit an individual article upon the fingers and convey them into the extension 21. The outer end of the trough 20 is provided with an upstanding flange and this end of the trough is cut to permit the passage therethrough of the outer ends of the shoes 17 and as the tongue 19 is provided with an outstanding end 40 it will readily support the fruit in position at the outer end of the trough as one of the shoes passes therethrough to remove the fruit.

While I have shown and described the preferred form of my invention I wish it to be understood that various changes and alterations may be carried out during the manufacture of the same without departing from the spirit of the invention or the scope of the appended claims.

Having thus described my invention what I claim is:

1. An advertising machine including a stationary housing having one end closed, a hopper struck from the closed end of the housing, a rotatable wheel mounted upon the housing at the closed end thereof, a receptacle arranged above the housing, an extension on said receptacle, a partition between the receptacle and extension forming a separate compartment of the extension, a trough projecting from one side of the housing, means conveying articles of fruit from the extension to the trough, means carried by the wheel for removing the articles of fruit from said trough during the revolution of the wheel, and for conveying fruit for deposit in the hopper on the housing, means conveying the fruit from the hopper to the interior of the housing, and means conveying the fruit from the housing upwardly into the extension.

2. An advertising machine including a housing, a hopper opening into the housing, a receptacle above the housing, an extension on the receptacle, a partition between the receptacle and extension to provide a separate compartment of the extension, a wheel mounted for rotary movement upon the extension adjacent the position of the hopper, a trough extending from one side of the housing, means for conveying articles of fruit from the extension compartment to the trough, means carried by the wheel for removing the fruit from the trough and conveying same to the hopper, and additional means for conveying articles of fruit from the hopper to the extension compartment.

3. An advertising machine including a housing, a hopper opening into the housing, a receptacle above the housing, an extension on the receptacle, a partition between the receptacle and extension to provide a separate compartment of the extension, a wheel mounted for rotary movement adjacent the position of the hopper, a trough extending from one side of the housing, means for conveying articles of fruit from the extension compartment to the trough, means carried by the wheel for removing the fruit from the trough and conveying same to the hopper, additional means for conveying articles of fruit from the hopper to the extension compartment, and an additional receptacle below the housing, transparent conveying pipes between the housing and the additional receptacle, and means for forcing liquid through said pipes.

4. A machine of the character described including a housing, a representation of a grinding machine arranged at one end of the housing, a hopper above said representation, a receptacle above the housing, an extension below the receptacle forming a compartment separate from the receptacle, a trough leading from one side of the housing, a wheel rotatably mounted upon the housing, a transparent conveying pipe between the separate compartment and the trough, U shaped transparent tubes carried by the wheel, means at one end of said tubes for removing articles of fruit from the trough and through rotation of the wheel deposit the articles of fruit in the hopper, and additional means for returning the articles of fruit to the separate compartment.

5. A machine of the character described including a housing having one end closed, a representation of a grinding machine at the closed end of the housing, a hopper at the closed end of the housing above said representation and opening into the housing, a trough extending from one side of the housing, a receptacle above the housing, an extension on the receptacle forming a separate compartment, a transparent conveying tube leading from the separate compartment to the trough, a rotatable wheel upon the housing, U shaped transparent tubes supported upon the wheel at spaced intervals, means carried by the wheel adjacent one end of each tube and adapted to cooperate with the trough for removing articles of fruit from the trough and conveying them to the hopper through the rotation of the wheel for discharging the fruit into the housing, and an endless conveyor for conveying the fruit from the housing to the extension.

6. A machine of the character described including a housing, a hopper at one end of the housing, a trough extending from one side of the housing, a receptacle above the housing divided into two compartments in non-communication, article washing means in one compartment and means for conveying articles between the other compartment and the trough and between the trough and the hopper.

7. A machine of the character described including a housing having one end closed, a hopper opening into the closed end of the housing, a receptacle above the housing for containing liquid, an agitator rotatable within the receptacle, an extension on the lower side of the receptacle forming a separate compartment, a trough extending from one side of the housing, means for conveying articles of fruit from the separate compartment to the trough, means for conveying articles of fruit from the trough and discharging them in the hopper, and additional means for returning articles of fruit to the separate compartment after being discharged into the hopper.

8. A machine of the character described including a housing having one end closed, a hopper opening through the closed end of the housing, a receptacle above the housing having an opening upon its upper side, a reflector mirror supported upon the receptacle at an angle above said opening, an agitator in the housing, an extension on the lower side of the housing forming a separate compartment, means for conveying articles of fruit from the housing to the separate compartment and additional means for returning the articles of fruit from the separate compartment through the housing to the hopper.

9. A machine of the character described including a support, means carried by the support forming a representation of a grinding machine, a hopper above said representation, a receptacle on the support above the hopper, an extension on the receptacle forming a separate compartment, means including transparent tubes for conveying articles of fruit from the separate compartment to the hopper, and additional means for returning the articles of fruit to the separate compartment after being deposited in the hopper.

10. An advertising machine comprising an article washer, a discharge pipe leading from the washer but in non-communication therewith, means for feeding articles to the discharge pipe at its point of attachment to the washer, means for conveying articles from the washer to a machine imitating device, and means for returning articles from said device to the washer.

11. An advertising machine comprising an article washer, a discharge pipe leading from the washer but in non-communication therewith, a machine imitating device, means for feeding articles from the discharge pipe to the machine imitating device, and additional means for conveying the articles from the machine imitating device to the discharge pipe at its point of attachment to the washer.

12. In an advertising machine a rotating structure including curved transparent tubes each having an inlet and an outlet.

13. In an advertising machine a rotating structure including curved transparent tubes each having an inlet and an outlet, and article collecting means at the inlet into said tubes.

14. An advertising machine including a stationary housing having one end closed, a hopper struck from the closed end of the housing, a rotatable wheel mounted upon the housing at the closed end thereof, a hollow member forming a separate compartment above the housing, a trough projecting from one side of the housing, means conveying articles of fruit from the hollow member to the trough, means carried by the wheel for removing the articles of fruit from said trough during the revolution of the wheel, and for conveying fruit for deposit in the hopper on the housing, means conveying the fruit from the hopper to the interior of the housing, and means conveying the fruit from the housing upwardly into the hollow member.

15. An advertising machine including a housing, a hopper opening into the housing, a hollow member forming a separate compartment above the housing, a wheel mounted for rotary movement adjacent the position of the hopper, a trough extending from one side of the housing, means for conveying articles of fruit from the hollow member to the trough, means carried by the wheel for removing the fruit from the trough and conveying same to the hopper, and additional means for conveying articles of fruit from the hopper to the hollow member.

16. An advertising machine including a housing, a hopper opening into the housing, a separate compartment above the housing, a wheel mounted for rotary movement upon the housing, a trough extending from one side of the housing, means for conveying articles of fruit from the hollow member to the trough, means carried by the wheel for removing the fruit from the trough and conveying same to the hopper, additional means for conveying articles of fruit from the hopper to the hollow member, and a receptacle below the housing, transparent conveying pipes between the housing and the receptacle, and means for forcing liquid through said pipes.

17. A machine of the character described including a housing, a representation of a grinding machine arranged at one end of the housing, a hopper above said representation, a hollow member forming a compartment, a trough leading from one side of the housing, a wheel rotatably mounted upon the housing, a transparent conveying pipe between the hollow member and the trough, U-shaped transparent tubes carried by the wheel, means at one end of said tubes for removing articles of fruit from the trough and through rotation of the wheel deposit the articles of fruit in the hopper, and additional means for returning the articles of fruit to the hollow member.

18. A machine of the character described including a housing having one end closed, a representation of a grinding machine at the closed end of the housing, a hopper at the closed end of the housing above said representation and opening into the housing, a trough extending from one side of the housing, a hollow member forming a compartment, a conveying tube leading from said compartment to the trough, a rotatable wheel upon the housing, U-shaped transparent tubes supported upon the wheel at spaced intervals, means carried by the wheel adjacent one end of each tube and adapted to cooperate with the trough for removing articles of fruit from the trough and conveying them to the hopper through the rotation of the wheel for discharging the fruit into the housing, and an endless conveyor for conveying the fruit from the housing to said compartment.

19. A machine of the character described including a housing, a hopper at one end of the housing, a trough extending from one side of the housing, a receptacle above the housing divided into two compartments in non-communication, article washing means in one compartment and means for conveying articles between the other compartment and the trough and between the trough and the hopper and between the hopper and the other compartment.

20. A machine of the class specified having a revolving wheel provided with ducts along which fruit articles may pass, and means for feeding fruit articles to said wheel.

21. A machine of the class specified having a revolving wheel provided with ducts along which fruit articles may pass, and means for feeding fruit articles to said wheel, and conveying the same therefrom.

22. A machine of the class specified comprising a revolving wheel provided with radial passages for articles, means for supplying the articles to the outer ends of said radial passages, means for receiving the discharge of fruit from the inner ends of said radial passages, and means for conveying the articles from said receiving means to said supplying means.

23. A machine of the class specified having a revolving wheel with means for conveying articles in a radial manner inwardly and an imitation grinding machine located centrally of said wheel so as to appear to receive the articles running through said radial passages.

24. A machine of the class specified having a revolving wheel with means for conveying articles in a radial manner inwardly and an imitation grinding machine located centrally of said wheel so as to appear to receive the articles running through said radial passages, and means for conveying the articles from the vicinity of the imitation grinding machine and discharging them back to the radial manner conveying means.

25. A machine of the class specified having a revolving wheel provided with visible article conveying passages.

26. A machine of the class specified having a revolving wheel provided with visible article conveying passages arranged in a general radial manner.

27. A machine of the class specified having a revolving wheel and provided with transparent ducts through which fruit articles may pass.

28. A machine of the class specified having a revolving wheel provided with means for conveying fruit articles in a radial manner, means for feeding fruit articles to said wheel, and means for conveying it from the same.

29. A machine of the class specified having a revolving wheel provided with means for conveying fruit articles in a radial manner, means for feeding fruit articles to said wheel, means for conveying it from the same, and means for returning the fruit conveyed from the wheel back to the same so as to form a continuous circuit of the fruit through the wheel and out of the same and then back again.

30. A machine of the class specified comprising a revolving wheel having means for conveying the fruit in a radial manner, means for supplying fruit to the wheel, said means comprising a traveling conveyor with projections to engage the fruit and means for conveying fruit from the wheel comprising a chute to receive fruit discharged by the wheel.

31. A machine of the class specified comprising a revolving wheel having means for conveying the fruit in a radial manner, means for supplying fruit to the wheel, said means comprising a traveling conveyor with projections to engage the fruit and means for conveying fruit from the wheel comprising a chute to receive fruit discharged by the wheel, said chute being arranged to convey fruit to the traveling conveyor.

32. A machine of the class specified having a revolving wheel provided with article conveying tubes arranged in a generally radial manner.

33. A machine of the class specified having a revolving wheel provided with fruit conveying passages arranged in a generally radial manner.

34. A machine of the class specified having a revolving wheel provided with transparent article tubes arranged in a generally radial manner.

35. A machine of the class specified having a revolving wheel provided with visible article passages or ducts arranged in a generally radial manner.

36. A machine of the class specified having a substantially circular revolving member provided with visible article ducts or passages arranged in a generally radial manner and open at their opposite ends.

37. A machine of the class specified having a substantially circular revolving member provided with transparent tubes arranged in a generally radial manner.

38. A machine of the class specified having a substantially circular revolving member provided with transparent tubes arranged in a generally radial manner and bent between their ends.

39. A machine of the class specified having a substantially circular revolving member provided with radially extending ducts or passages having open outer and inner ends to permit the passage of articles into and through and out of them.

40. A machine of the class specified having a rotary member provided with radially arranged ducts or passages open at their opposite ends to permit the passage of articles into and through and out of them.

41. A machine of the class specified having a rotary member provided with radially arranged ducts or passages open at their opposite ends to permit the passage of articles into and through and out of them, in combination with means for feeding articles to one open end of said ducts or passages.

42. A machine of the class specified having a rotary member provided with radially arranged ducts or passages open at their opposite ends to permit the passage of articles into and through and out of them, in combination with means for feeding articles to the outer open ends of said ducts or passages when said ends are in a receiving position.

43. A machine of the class specified having a rotary member provided with radially arranged ducts or passages open at their opposite ends to permit the passage of articles into and through and out of them, in combination with means for receiving articles from one of the open ends of said ducts or passages.

44. A machine of the class specified having a rotary member provided with radially arranged ducts or passages open at their opposite ends to permit the passage of articles into and through and out of them, in combination with means for receiving articles from the inner ends of said ducts or passages when the same are in downward positions.

45. A machine of the class specified having a rotary member provided with visible article conveying passages, in combination with means for rotating said member.

46. A machine of the class specified having a rotary member provided with visible article conveying passages bent between their ends in combination with means for rotating said rotary member.

47. A machine of the class specified having a rotary member provided with transparent tubular members having open ends to permit articles to pass into, through and out of them.

48. A machine of the class specified having a rotary member provided with transparent tubular members having open ends to permit articles to pass into, through and out of them, in combination with means for feeding articles to one open end of said tubular members.

49. A machine of the class specified having a rotary member provided with transparent tubular members having open ends to permit articles to pass into, through and out of them, in combination with means for receiving articles delivered from one of the open ends of said tubular members.

50. A machine of the class specified having a rotary member provided with transparent tubular members having open ends to permit articles to pass into, through and out of them, in combination with means for feeding articles to one of the ends of said tubular members and for receiving articles from the other ends thereof.

51. A machine of the class specified having a rotary member provided with transparent tubular members having open ends to permit articles to pass into, through and out of them, in combination with means for feeding articles to the ends of said tubular members which are uppermost as the rotary member revolves and means for receiving articles from the lower ends of said tubular members.

52. A machine of the class specified having a rotary member provided with radially extending transparent tubular members and means for causing the passage of articles into, and out of said tubular members as said rotary member revolves.

53. A machine of the class specified having a rotary member provided with radially extending tubular transparent members and a means for causing the passage of articles into the outer ends of said tubular members and out of the inner ends of the same.

54. A machine of the class specified having a rotary member provided with radially arranged transparent tubular members and means for feeding articles into the outer ends of said tubular members when said ends are in an elevated position.

55. A machine of the class specified having a rotary member provided with radially arranged transparent tubular members and means for feeding articles into the outer ends of said tubular members when said ends are in an elevated position, and means for receiving articles from the inner ends of said tubular members when said inner ends are in a low position.

56. A machine of the class specified having a rotary member provided with radially arranged passages open at their outer and inner ends and means for feeding articles to said passages and receiving the same therefrom.

57. A machine of the class specified having an annular member provided with radially arranged passages bent between their inner and outer ends, said passages being open at their inner and outer ends in combination with means for causing the flow of articles into, through and out of said passages.

58. A machine of the class specified having an annular member provided with radially arranged passages bent between their inner and outer ends, said passages being open at their inner and outer ends in combination with means for causing the flow of articles into, and out of said passages, said means comprising a trough to receive articles and cooperating members to lift said articles from the trough and direct them into said passages and a hopper for receiving articles from said passages.

59. A machine of the class specified having an annular rotary member provided with passages which extend laterally in opposite directions.

60. A machine of the class specified having a rotary member provided with visible article passages having laterally bent portions.

61. A machine of the class specified having an annular rotary member provided with visible article conveying passages having laterally extending portions.

62. A machine of the class specified having an annular rotary member provided with transparent tubular members having laterally extending portions, which extend in substantially opposite directions.

63. A machine of the class specified having a rotary member provided with open ended passages and means for feeding articles to said passages comprising a trough to receive the articles and a receiving shoe cooperating with the trough to take articles therefrom.

64. A machine of the class specified having a rotary member provided with open ended passages and means for feeding articles to said passages comprising a trough to receive the articles and a receiving shoe cooperating with the trough to take articles therefrom, said trough and tongue having cooperating bifurcated portions.

65. A machine of the class specified having a rotary member provided with open ended passages and means for feeding articles to said passages comprising a trough to receive the articles and to a receiving shoe cooperating with the trough to take articles therefrom, and means for feeding articles to said trough.

66. A machine of the class specified having a rotary member provided with open ended passages and means for feeding articles to said passages comprising a trough to receive the articles and a receiving shoe cooperating with the trough to take articles therefrom, and means for feeding articles to said trough, and means for receiving articles from said passages and feeding them to said feeding means.

67. A machine of the class specified having a rotary member provided with passages having an open end and means for feeding articles to said open end of said passages when said ends are below their uppermost positions, whereby when said ends are elevated by the rotation of said member, the articles will run down said passage.

68. A machine of the class specified having a rotary member provided with open ended passages in combination with means for feeding articles to one of the open ends of said passages when said open end is below its uppermost position, whereby said end is elevated by the rotation of said member, the articles will run down said passages and out of the lower open end thereof.

69. A machine of the class specified provided with open ended passages in combination with means for feeding articles to one of the open ends of said passages when said ends are below their uppermost positions and means for receiving articles from other open ends of said passages when said passages are advanced by rotation of said member so that the last mentioned open ends are in a relatively low position.

70. A machine of the class specified having a rotary member provided with open ended passages in combination with means for feeding articles to said passages when one of the open ends thereof are at one side of the rotary member and means for receiving articles from the other open ends of said passages when the first mentioned open end is at the top of the rotary member.

71. A machine of the class specified having a rotary member provided with open ended radially extending passages in combination with means for feeding articles to the outer open ends of said passages when said outer open ends are below their uppermost positions, whereby said articles will run through and out of said passages when the rotary member is turned to elevate said outer open ends.

72. A machine of the class specified having a rotary member provided with open ended radially extending passages in combination with means for feeding articles to the outer open ends of said passages when said outer open ends are below their uppermost positions, whereby said articles will run through and out of said passages when the rotary member is turned to elevate said outer open ends, and means for receiving articles from the inner open ends of said passages when the outer open ends thereof are in their uppermost positions.

73. A machine of the class specified having a rotary member provided with open ended radially extending passages in combination with means for feeding articles to the outer open ends of said passages when said outer open ends are below their uppermost positions, whereby said articles will run through and out of said passages when the rotary member is turned to elevate said outer open ends, said passages being bent between their ends.

74. A machine of the class specified having a rotary member provided with open ended radially extending passages in combination with means for feeding articles to the outer open ends of said passages when said outer open ends are below their uppermost positions, whereby said articles will run through and out of said passages when the rotary member is turned to elevate said outer open ends, said passages being bent between their ends so as to extend in substantially opposite lateral directions.

75. A machine of the class specified having a rotary member provided with open ended radially extending passages in combination with means for feeding articles to the outer open ends of said passages when said outer open ends are below their uppermost positions, whereby said articles will run through and out of said passages when the rotary member is turned to elevate said outer open ends, said passages having laterally extending portions which extend down radially from the outer open ends of the passages when the articles are being fed to said outer open ends.

76. A machine of the class specified having a rotary member provided with open ended radially extending passages in combination with means for feeding articles to the outer open ends of said passages when said outer open ends are below their uppermost positions, whereby said articles will run through and out of said passages when the rotary member is turned to elevate said outer open ends, said passages having laterally extending portions which extend down radially from the outer open ends of the passages when the articles are being fed to said outer open ends, and also having other portions extending laterally in substantially opposite directions so as to form laterally and inwardly extending inner portions of said passages.

77. A machine of the class specified having a rotary member provided with open ended radially extending passages in combination with means for feeding articles to the outer open ends of said passages when said outer open ends are below their uppermost positions, whereby said articles will run through and out of said passages when the rotary member is turned to elevate said outer open ends, said passages having laterally extending portions which extend down radially from the outer open ends of the passages when the articles are being fed to said outer open ends, and also having other portions extending laterally in substantially opposite directions so as to form laterally and inwardly extending inner portions of said passages, in combination with means for receiving articles from the inner ends of said passages when said passages are in upper positions.

In testimony whereof I affix my signature.

HULEN M. HARRISON.